United States Patent
Hirano et al.

(10) Patent No.: US 8,842,507 B1
(45) Date of Patent: Sep. 23, 2014

(54) HEAT-ASSISTED MAGNETIC RECORDING DISK DRIVE (HAMR) WITH THERMAL SENSOR AND LASER POWER PREDICTION

(71) Applicant: HGST Netherlands B.V., Amsterdam (NL)

(72) Inventors: Toshiki Hirano, San Jose, CA (US); Lidu Huang, Danville, CA (US); Tetsuo Semba, San Jose, CA (US); Barry Cushing Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/059,653

(22) Filed: Oct. 22, 2013

(51) Int. Cl.
  *G11B 5/02* (2006.01)
(52) U.S. Cl.
  USPC .............. 369/13.33; 369/13.13; 369/13.26; 369/47.5; 369/53.26; 369/112.27; 369/116
(58) Field of Classification Search
  None
  See application file for complete search history.

(56) References Cited

U.S. PATENT DOCUMENTS

| | | | |
|---|---|---|---|
| 8,149,653 B2 | 4/2012 | Shimazawa et al. | |
| 8,369,191 B2 | 2/2013 | Shimazawa | |
| 8,391,107 B2 | 3/2013 | Gage et al. | |
| 8,406,091 B2 | 3/2013 | Shimazawa et al. | |
| 8,451,696 B2 | 5/2013 | Huang et al. | |
| 2009/0225464 A1 | 9/2009 | Juang et al. | |
| 2011/0122737 A1 | 5/2011 | Shimazawa et al. | |
| 2011/0205861 A1 | 8/2011 | Erden et al. | |
| 2011/0228651 A1 | 9/2011 | Gage et al. | |
| 2012/0201108 A1 | 8/2012 | Zheng et al. | |

OTHER PUBLICATIONS

Xu et al., "Dynamic Thermal Responses of Heat-Assisted Magnetic Recording Head in Data Writing Process", IEEE Transactions on Magnetics, vol. 48, No. 11, Nov. 2012, pp. 3280-3283.

*Primary Examiner* — Wayne Young
*Assistant Examiner* — Brian Butcher
(74) *Attorney, Agent, or Firm* — Thomas R. Berthold (57) ABSTRACT

A thermally-assisted magnetic recording (HAMR) disk drive uses a thermal sensor to accurately monitor laser power during writing. The disk drive controller, or a separate processor, computes a prediction of the laser power from a history of laser power settings. This predicted value is compared with the measured value from the thermal sensor. If the difference is too large or too small, indicating that the laser power is too high or too low, an error signal is sent to the disk drive controller. The disk drive controller may adjust the laser power setting and initiate a re-write of the data. The predicted laser power is calculated from a convolution of a sequence of current and prior laser power settings with a sequence of coefficients. A calibration process generates the sequence of coefficients when the disk drive is idle or just after it is powered on.

16 Claims, 9 Drawing Sheets

HEAT-ASSISTED MAGNETIC RECORDING DISK DRIVE (HAMR) WITH THERMAL SENSOR AND LASER POWER PREDICTION

BACKGROUND OF THE INVENTION

1. Field of the Invention

This invention relates generally to a heat-assisted magnetic recording (HAMR) type of magnetic recording disk drive, and more particularly to a HAMR disk drive with a sensor for measuring laser power.

2. Description of the Related Art

Heat-assisted magnetic recording (HAMR), sometimes also called thermally-assisted recording (TAR), has been proposed. In HAMR disk drives, an optical waveguide with a near-field transducer (NFT) directs heat from a radiation source, such as a laser, to heat localized regions of the magnetic recording layer on the disk. The radiation heats the magnetic material locally to near or above its Curie temperature to lower the coercivity enough for writing to occur by the write head. HAMR disk drives have been proposed for conventional magnetic recording disks where the magnetic recording layer on the disk is a continuous layer of magnetic recording material. HAMR disk drives have also been proposed for bit-patterned media (BPM) where the magnetic recording layer is patterned into small isolated data islands, each island containing a single magnetic "bit" and separated from neighboring islands by nonmagnetic spaces.

It is important during writing that the output power at the NFT be within a predetermined range. If the laser power setting is too low and thus the NFT output power too low, the desired data bit will not be magnetized. If the laser power setting is too high and thus the NFT output power too high, bits adjacent to the desired data bit will also be magnetized. While a photo-detector can be used to monitor the laser power, the additional cost makes this an unattractive solution. An electrically conductive thermal sensor has been proposed, but the response time is so slow that accurate laser power monitoring at each data sector is not possible.

What is needed is a HAMR disk drive that can use a thermal sensor to accurately measure laser power during writing.

SUMMARY OF THE INVENTION

Embodiments of the invention relate to a HAMR disk drive that uses a thermal sensor to accurately monitor laser power during writing. Because the response time of the thermal sensor is too slow for accurate monitoring, the disk drive controller, or a separate processor, computes a prediction of the laser power from a history of laser power settings. This predicted value is compared with the measured value. If the difference is too large or too small, indicating that the laser power is too high or too low, an error signal is sent to the disk drive controller. The disk drive controller may adjust the laser power setting and initiate a re-write of the data. The predicted laser power is calculated from a convolution of a sequence of current and prior laser power settings with a sequence of coefficients. The sequence of coefficients is generated by a calibration process when the disk drive is idle or just after it is powered on. The laser is turned on at a nominal power setting for a predetermined time, such as the time for one data sector. The thermal sensor then measures power values at regular time intervals, and these values represent the sequence of coefficients.

In a preferred embodiment the thermal sensor is located adjacent the waveguide and recessed from the air-bearing surface (ABS) of the slider that supports the NFT and the write head. In an alternative embodiment the thermal sensor is located near the ABS.

For a fuller understanding of the nature and advantages of the present invention, reference should be made to the following detailed description taken together with the accompanying figures.

DETAILED DESCRIPTION OF THE INVENTION

Figure 1:
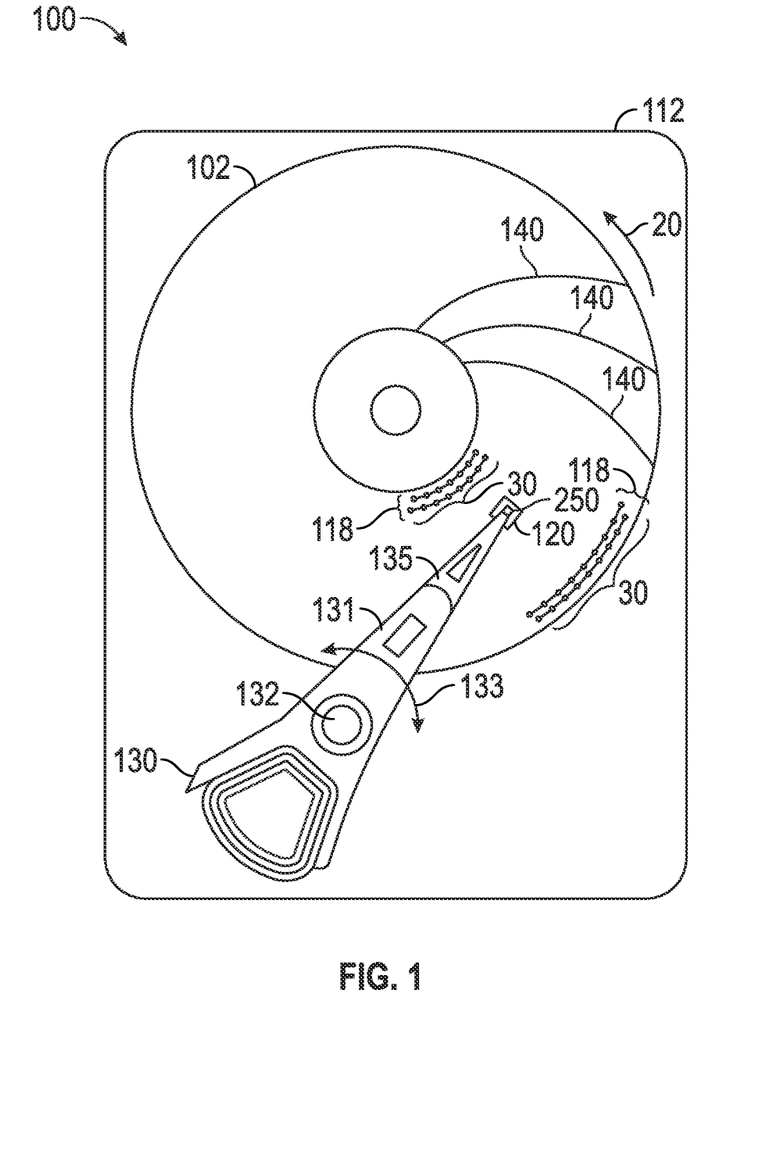
FIG. 1 is a top view of a heat-assisted magnetic recording (HAMR) disk drive according to the invention.

FIG. 1 is a top view of a HAMR disk drive 100 according to the invention. The disk drive 100 is depicted with the disk 102 having a BPM magnetic recording layer, but the disk 102 could be a conventional disk with a continuous media magnetic recording layer. The drive 100 has a housing or base 112 that supports an actuator 130 and a drive motor for rotating the magnetic recording disk 102. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 102 and enables it to "pitch" and "roll" on the air-bearing generated by the disk 102 as it rotates in the direction of arrow 20. A magnetoresistive read head (not shown) and an inductive write head (not shown) are typically formed as an integrated read/write head patterned as a series of thin films and structures on the trailing end of the slider 120, as is well known in the art. In a HAMR disk drive the slider 120 also supports the optical waveguide (not shown) and the NFT (not shown) for heating the BPM data islands or regions of the continuous magnetic recording layer. The laser light source 250 is depicted as being located on slider 120 but alternatively may be located on suspension 135. The laser 250 may be a laser diode, for example a CD-RW type laser diode that provides optical radiation with a wavelength of approximately 780 nm. Only one disk surface with associated slider and read/write head is shown in FIG. 1, but there are typically multiple disks stacked on a hub that is rotated by a spindle motor, with a separate slider and read/write head associated with each surface of each disk.

The BPM magnetic recording disk 102 includes a disk substrate and discrete data islands 30 of magnetizable material on the substrate. The data islands 30 are arranged in radially-spaced tracks 118, with only a few islands 30 and representative tracks 118 near the inner and outer diameters of disk 102 being shown in FIG. 1. Within each track the data islands are grouped into data sectors, with each data sector preceded by a nondata synchronization field. The disk also includes equally-angularly spaced servo sectors, several of which are shown as servo sectors 140, that extend generally radially across the data tracks 118. The servo sectors 140 are pre-recorded or formatted nondata regions that contain read/write head positioning information and are not intended to be overwritten. As the disk 102 rotates in the direction of arrow 20, the movement of actuator 130 allows the read/write head on the trailing end of slider 120 to access different data tracks 118 and different data sectors with the data tracks. If the disk 102 is a continuous media disk, the magnetic recording layer also has a plurality of radially spaced tracks, with each track having a plurality of data sectors.

Figure 2:
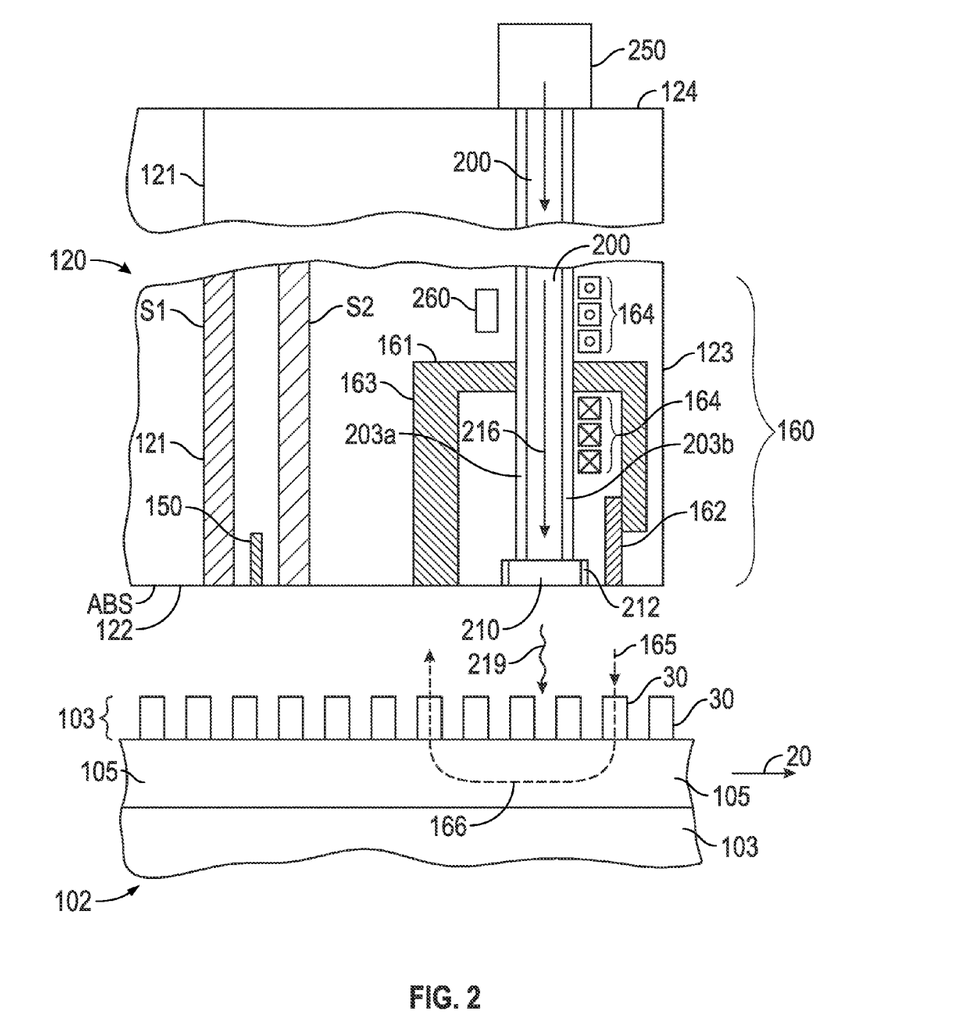
FIG. 2 is a sectional view through a portion of the air-bearing slider and perpendicular magnetic recording disk showing the arrangement of the optical waveguide, write head, NFT and thermal sensor in an embodiment of the invention.

FIG. 2, which is not drawn to scale because of the difficulty in showing the very small features, is a sectional view through a portion of the air-bearing slider 120 and BPM disk 102. The disk 102 has a perpendicular magnetic recording layer 103 patterned into discrete data islands 30, and a soft magnetic underlayer (SUL) 105 that provides a flux return path 166. The slider 120 has a trailing surface 121 and an air-bearing surface (ABS) surface 122 oriented generally perpendicular to trailing surface 121. The slider 120 is typically formed of a composite material, such as a composite of alumina/titanium-carbide ($Al_2O_3$/TiC), and supports the read and write elements that are typically formed as a series of thin films and structures on its trailing surface 121. The surface 121 is called the trailing surface because of the direction 20 of the disk 102 relative to slider 120. The ABS 122 is the disk-facing surface of the slider 120 that faces the disk 102 and is shown without the thin protective overcoat typically present in an actual slider. The disk-facing surface or ABS shall mean the surface of the slider that is covered with a thin protective overcoat, the actual outer surface of the slider if there is no overcoat, or the outer surface of the overcoat.

The slider 120 supports a conventional magnetoresistive read head 150 located between shields S1 and S2, and a conventional perpendicular write head 160 that includes a magnetic yoke 161 with a write pole 162, a flux return pole 163, and an electrically conductive coil 164. The write coil 164 is shown as wrapped around yoke 161 with the electrical current directions being shown as into the paper by the coil cross-sections marked with an "X" and out of the paper by the coil cross-sections marked with a solid circle. When write-current pulses are directed through coil 164, the write pole 162 directs magnetic flux to the data islands 30, as represented by arrow 165. The dashed line 166 with arrows shows the flux return path back to the return pole 163 through SUL 105. As is known in the art, the coil may also be of the helical type.

The slider 120 also includes a waveguide or optical channel 200 with a near-field transducer (NFT) 210 near the ABS 122, and a thermal sensor 260. The optical waveguide 200 is depicted in FIG. 2 as extending through the yoke 161 and being located between the write pole 162 and the return pole 163. The optical waveguide 200 directs radiation from laser 250 on the slider top surface 124 to the NFT 210, as depicted by arrow 216. The NFT 210 directs near-field radiation, as represented by wavy arrow 219, to the data islands 30 as the disk 102 moves in the direction 20 relative to the slider 120.

The thermal sensor 260 may be an electrically conductive film or thin wire that exhibits a change in resistance (dR) with a change in temperature (dT). To maximize the signal-to-noise ratio (SNR) from the sensor 260, the material should have a large dR/dT while the resistance should be smaller than approximately 1 k-ohm to reduce the RC time constant and shot noise. Preferably the thermal sensor 260 is formed of metal or metal alloy, but may also be formed of a thermistor material, a semiconductor, or two materials to form a thermocouple junction. In a preferred embodiment the thermal sensor 260 is located adjacent the waveguide 200 and recessed from the ABS, as shown in FIG. 2. The sensor 260 may be an electrical wire extending between two contacts (not shown) in a direction that is substantially perpendicular to the orientation of the waveguide 200. In one example, the waveguide 200 extends in a direction perpendicular to the ABS toward the NFT 210 and the sensor 260 extends in a cross-track direction generally orthogonal to the waveguide 200. As the laser light 250 passes through the waveguide 200, about five percent of the power is used to heat the sensor 260, causing the resistance of the sensor 260 to change. In an alternative embodiment the thermal sensor 260 is located at the ABS near the NFT and is heated by the NFT.

Figure 3:
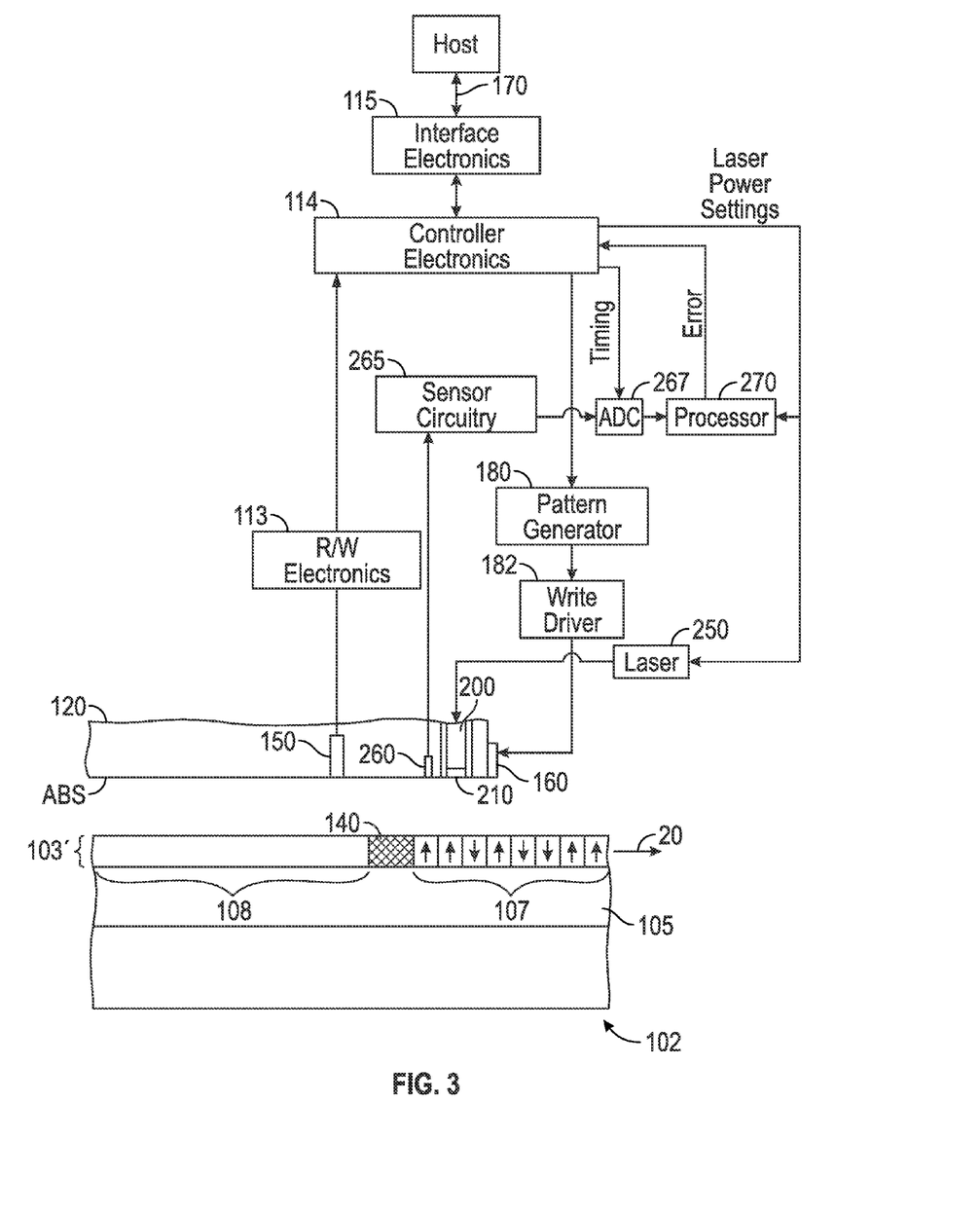
FIG. 3 is a schematic illustrating the general features and operation of an embodiment of the invention.

FIG. 3, which is not drawn to scale because of the difficulty in showing the very small features, is a schematic illustrating the general features and operation of an embodiment of the invention and also shows the transfer of data between a host system, such as a PC, and the disk drive. FIG. 3 shows a sectional view of the recording disk 102, which in this example is a continuous media disk with a perpendicular magnetic recording layer 103' having data tracks that contain data sectors, such as data sectors 107, 108, an nondata servo sectors 140. The disk 102 is a perpendicular magnetic recording disk and thus the arrows depicted in the data sector 107 of recording layer 103' represent the magnetic moments or magnetization directions of the data bits. The signals from recorded data bits in the recording layer 103' are detected by read head 150, and amplified and decoded by read/write electronics 113. Data is sent to controller electronics 114 and through interface electronics 115 to the host via interface 170. The data to be written to the disk 102 is sent from the host to interface electronics 115 and controller electronics 114 and then as a data queue to pattern generator 180 and then to write driver 182. The write driver 182 generates high-frequency current pulses to the coil of write head 160 which results in the magnetic write fields that magnetizes the data bits in recording layer 103'.

In FIG. 3 a portion of the air-bearing slider 120 is depicted in sectional view above disk 102 and is shown with the read head 150, the write head 160, optical channel 200 and thermal sensor 260. FIG. 3 depicts the alternative embodiment wherein the thermal sensor 260 is located at the ABS near the NFT 210, but the thermal sensor 260 may also be located near the waveguide 200 and recessed from the ABS, as depicted in FIG. 2. The end of the optical channel 200 interfaces the NFT 210 at the disk-facing surface or air-bearing surface (ABS) of the slider 120. The laser 250, such as a diode laser, directs radiation to optical waveguide 200. As is known in the art, there may also be a coupling element (not shown) to improve coupling of the radiation into the waveguide, such as a grating or spot-size converter. The radiation strikes the NFT 210 creating concentrated near-field radiation that heats the recording layer 103' as the disk rotates in the direction 20 past the slider 120. The recording or writing of data occurs by an inductive coil write head 160 that has a write pole that generates a magnetic field to magnetize the recording layer 103' as the recording layer is heated by the NFT 210.

It is important during writing that the output power at the NFT be within a predetermined range. If the laser power setting is too low and thus the NFT output power too low, the desired data bit will not be magnetized. If the laser power setting is too high and thus the NFT output power too high, bits adjacent to the desired data bit will also be magnetized. While a photo-detector can be used to monitor the laser power, the additional cost makes this an unattractive solution. An electrically conductive thermal sensor has been proposed, but the response time is so slow that accurate laser power monitoring at each data sector is not possible.

In embodiments of this invention a thermal sensor provides a measured laser power value and a processor uses the measured value and a history of the laser power settings to determine if the laser output power is within the predetermined range. Referring again to FIG. 3, the controller electronics 114 also sends laser power settings to laser 250 and to a processor 270. The thermal sensor 260 is connected to sensor circuitry 265 which sends an analog output signal to an analog-to-digital converter (ADC) 267. The processor 270 also receives digital values from ADC 267 which are representative of the actual optical power generated by the NFT 210 and detected by thermal sensor 260. The ADC 267 is controlled by timing pulses from controller electronics 114. As will be described further in detail the processor 270 uses the measured power values from thermal sensor 260 and a history of the laser power settings from controller electronics 114 to generate a prediction of the laser power. This predicted laser power value is compared with the measured power value to generate an error signal to the controller electronics 114 if the measured power value is too high or too low. In response to this error signal the controller electronics can adjust the laser power setting and cause the data sectors to be rewritten. The controller electronics 114 can include and/or be implemented by a microcontroller or microprocessor. The controller or processor runs a computer program that is stored in memory and that embodies the logic and algorithms described herein. The memory may be separate from the controller or as embedded memory on the controller chip. The computer program may also be implemented in microcode or other type of memory accessible to the controller. While FIG. 3 depicts a separate processor 270 for performing the functions described herein, the processor may be part of the controller electronics 114.

Figure 4:
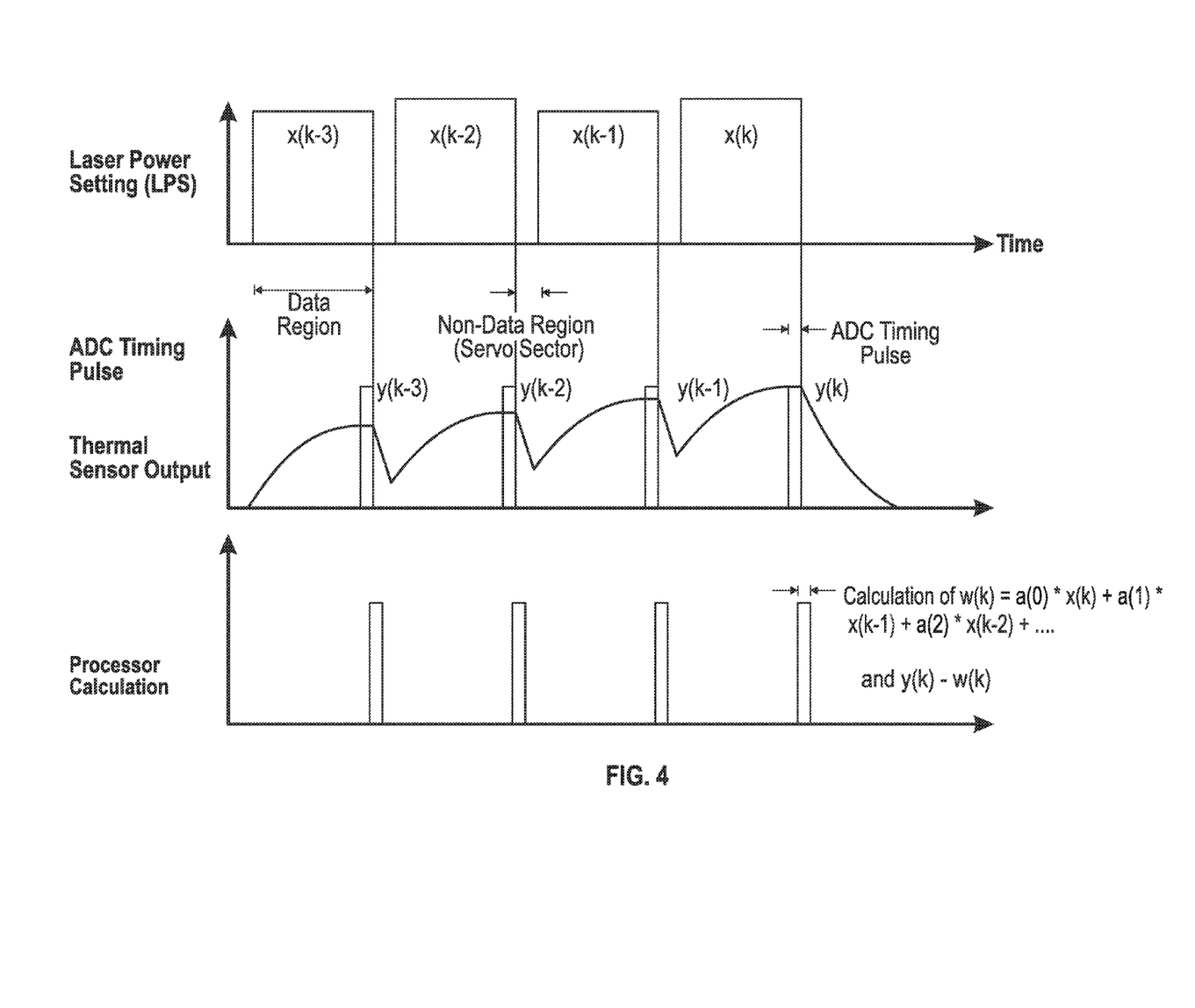
FIG. 4 is a timing diagram for an example of the laser power settings, the ADC timing pulse and thermal sensor analog output, and the processor calculations according to an embodiment of the invention.

FIG. 4 is a timing diagram for an example of the laser power settings, the ADC timing pulse and thermal sensor analog output, and the processor calculations. The laser power setting is set by the controller electronics and is shown for four successive write periods, where the laser power settings have corresponding values x(k−3), x(k−2), x(k−1) and x(k). During each write period data is written to a data region, which may be one data sector or contiguous data sectors. As shown, the laser power setting is set to 0 when nondata regions, such as servo sectors, pass beneath the NFT. The nominal design laser power setting for writing may be 1, but for various design reasons, such as changes in temperature or degraded performance of the laser diode over time, the controller electronics may be able to set incremental values other than 1, such as 0.98, 1.1 etc. Just before the end of each write period the ADC receives a timing pulse from the controller electronics and provides digital values representative of measured power from the thermal sensor. Thus the measure power values y(k−3), y(k−2), y(k−1) and y(k) correspond to the actual laser power settings x(k−3), x(k−2), x(k−1) and x(k), respectively. At the end of each write period, during which the laser power setting is 0, the processor calculates the predicted laser power w(k) according to the following:

$$w(k)=a(0)*x(k)+a(1)*x(k-1)+a(2)*x(k-2)+a(3)*x(k-3)+ \quad \text{Equation (1)}$$

where a(0), a(1) etc. are predetermined coefficients measured from a calibration procedure for the laser. Equation 1 is the convolution of the sequence x(k) with the coefficient sequence a(n). The processor then compares y(k) with w(k) by calculating the difference.

Figure 5:
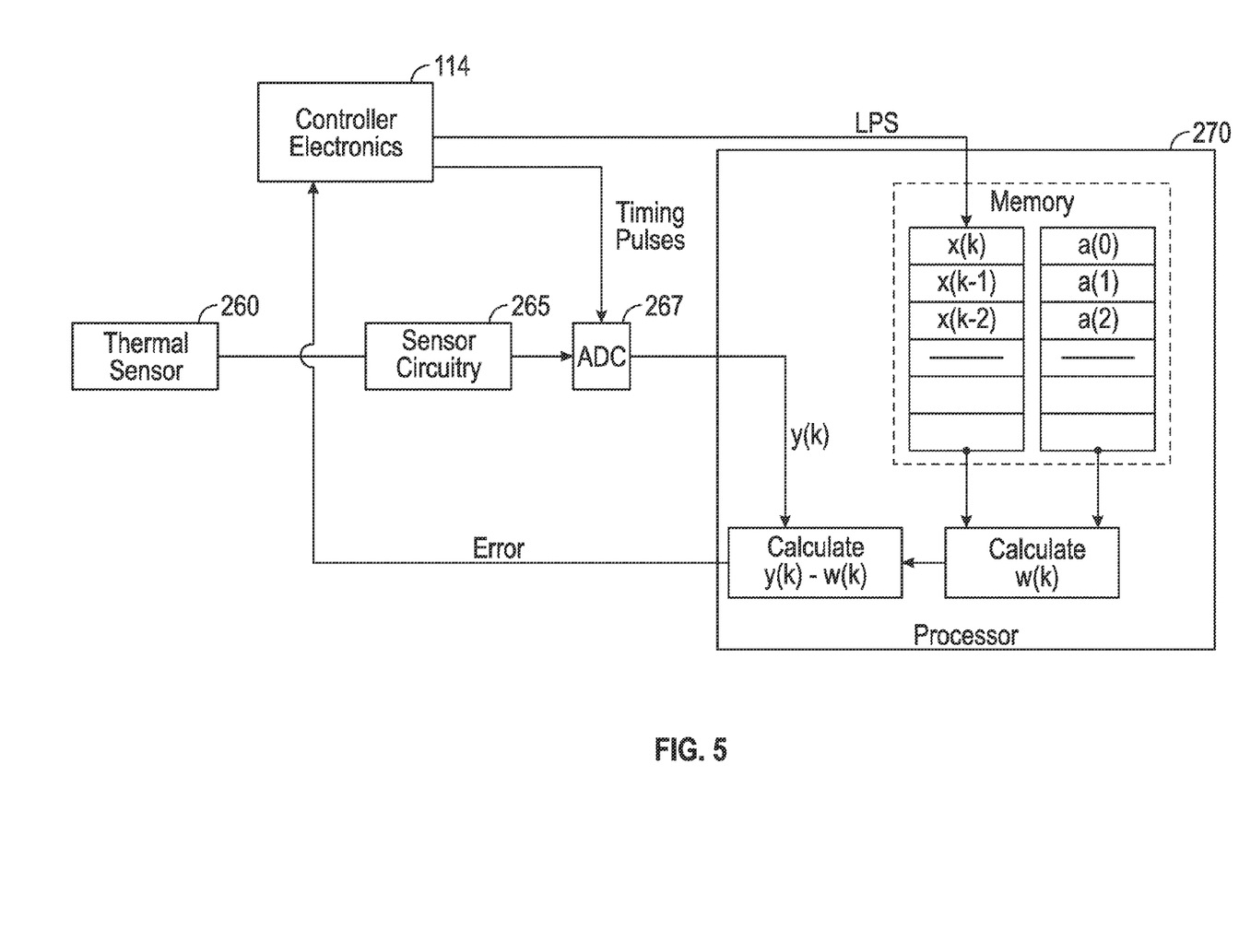
FIG. 5 is a block diagram showing in more detail the operation of the processor according to an embodiment of the invention.
Figure 6:
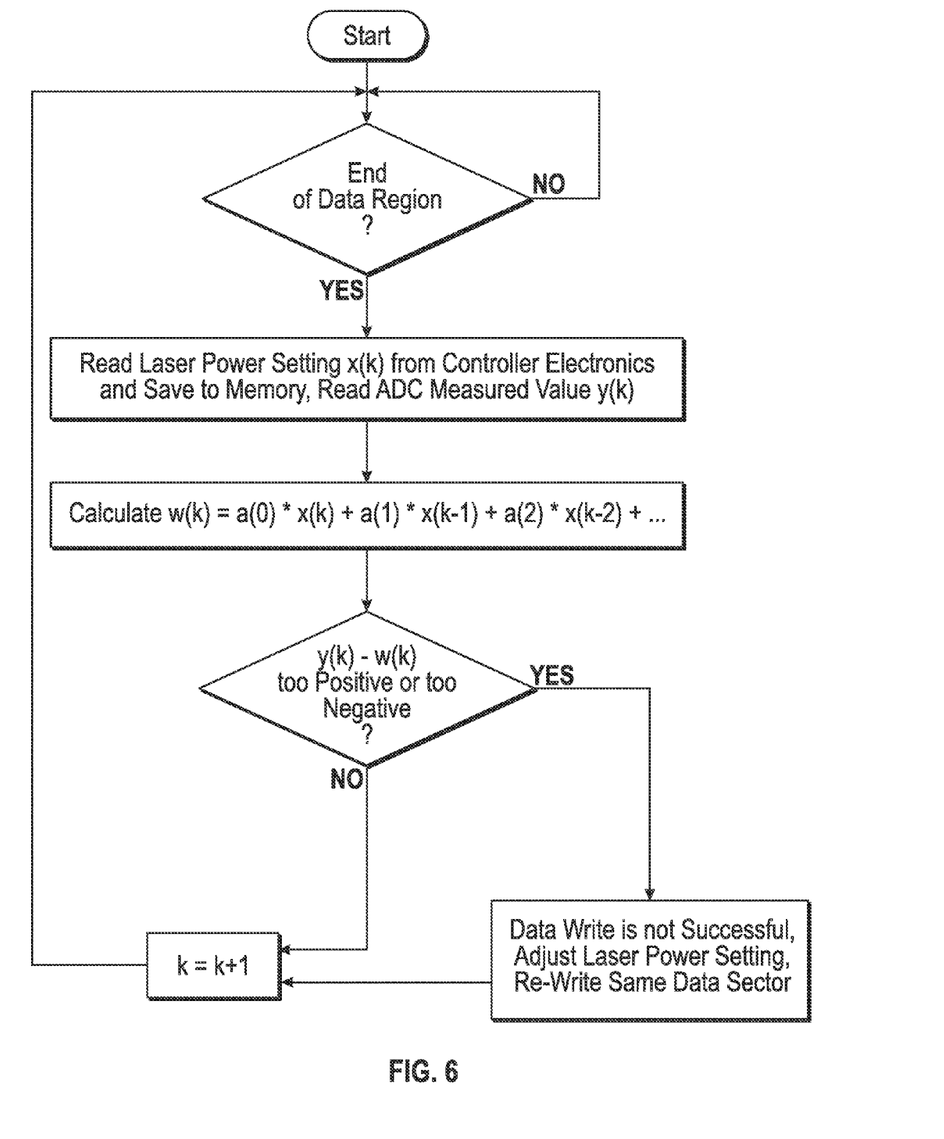
FIG. 6 is a flow chart illustrating a method of operation of an embodiment of the invention for calculating the predicted laser power and comparing it to the measured laser power.

FIG. 5 is a block diagram showing in more detail the operation of the processor 270. The current laser power setting x(k) and the history of prior laser power settings x(k−1), x(k−2), etc. are received from controller electronics and stored in memory. The set of coefficients a(0), a(1) etc. are also stored in memory. The processor calculates the predicted power level w(k) from Equation (1) and then the difference y(k)−w(k), where y(k) is the measured power value when the laser power setting is x(k). If the difference is too positive (measured power value too high) or too negative (measured power value too low), as compared to predetermined high and low thresholds, an error signal is sent to controller electronics 114. This is equivalent to comparing the absolute value of y(k)−w(k) to a predetermined threshold. The controller electronics may then adjust the laser power setting and cause the data to be re-written in the data region. FIG. 6 is a flow chart for the process.

Figure 7:
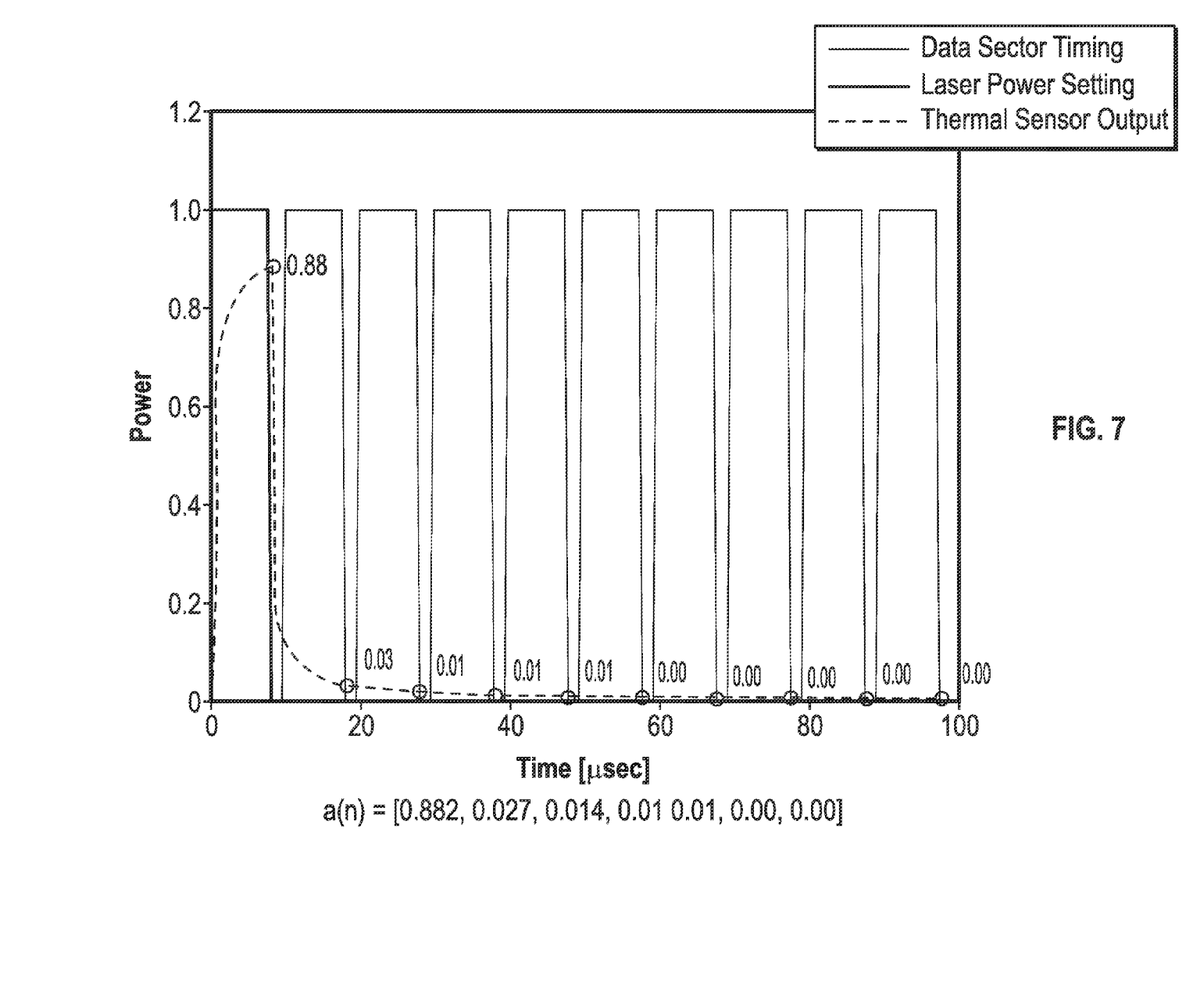
FIG. 7 is a graph of a laser power setting and measured power values at predetermined time intervals as part of the calibration process according to an embodiment of the invention.
Figure 8:
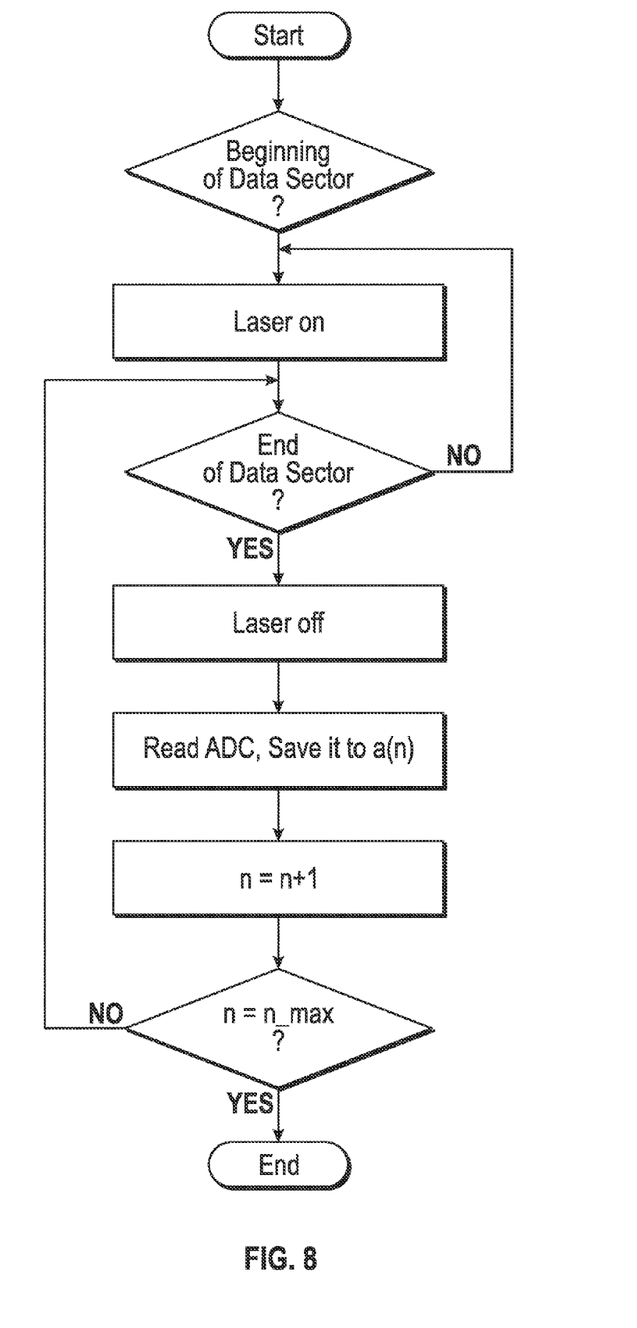
FIG. 8 is a flow chart for the calibration process according to an embodiment of the invention.

The calibration process for determining the coefficient sequence a(n) (i.e., coefficients a(0), a(1) etc.) will be explained with FIG. 7 and the flow chart of FIG. 8. The calibration process can be performed whenever the disk drive is first powered on or when the disk drive is idle, i.e., powered on but not reading or writing data. At the beginning of a data sector, the laser power is turned on and set to a nominal power setting, for example 1. The laser remains at this power setting for a predetermined time period, until the end of the data sector, and is then turned off (laser power setting 0). At the end of the data sector, the measured power is detected from the ADC and stored as the first coefficient a(0). The measured power from the ADC is then detected at predetermined regular time intervals, for example the time for one data sector, and these values are stored as coefficients a(1), a(2) etc. This continues until the predetermined number n max of time intervals has passed. FIG. 7 shows the analog output from the thermal sensor with the measured values at each interval, and the corresponding coefficient sequence a(n). The greater the number of prior power settings x(k−1) etc. and thus the greater number n of coefficients in a(n), the greater is the accuracy of the predicted power value w(k). A computer simulation of actual laser power settings has shown that when the prior history is 10 samples, the predicted value is within 0.1% of the actual power setting. When the prior history is 3 samples, the predicted value is still within 1.7% of the actual power setting, which is acceptable.

As described above the HAMR disk drive uses a near-field transducer (NFT) to heat regions of the magnetic recording layer on the disk. As used herein a "near-field" transducer refers to "near-field optics", wherein the passage of light is through an element with subwavelength features and the light is coupled to a second element, such as a substrate like a magnetic recording medium, located a subwavelength distance from the first element. NFTs typically use a low-loss metal (e.g., Au, Ag, Al or Cu) shaped in such a way to concentrate surface charge motion at a surface feature shaped as a primary apex or tip. Oscillating tip charge creates an intense near-field pattern. Sometimes, the metal structure can create resonant charge motion, called surface plasmons or local plasmons, to further increase intensity. The electromagnetic field of the oscillating tip charge then gives rise to optical output in the near field, which may be directed onto, for example, a substrate such as magnetic recording medium to heat regions of the medium.

Figure 9:
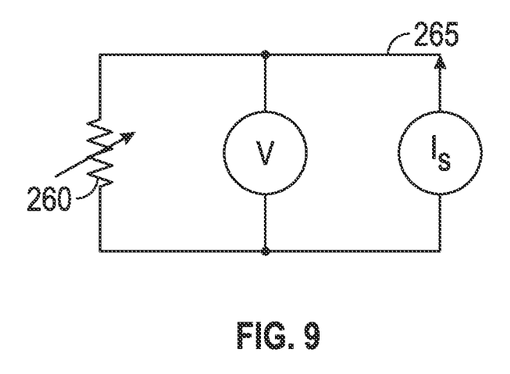
FIG. 9 is an example of sensor circuitry according to an embodiment of the invention for illustrating how the temperature sensor functions as a variable resistor in response to changes in temperature caused by heating.

FIG. 9 is the sensor circuitry circuit 265 for illustrating how the thermal sensor 260 functions as a variable resistor in response to changes in temperature caused by heating from the waveguide in the preferred embodiment of the thermal sensor, or by heating as the amplitude of charge density oscillation changes in the NFT in the alternative embodiment of the thermal sensor. A current source $I_s$ supplies a constant current to the sensor 265 and the change in temperature changes the resistance which is detected as a change in voltage of circuitry 265.

The operation of embodiments of this invention as described above may be implemented as a set of computer program instructions stored in memory and executable by a processor, such as the processor 270, or a separate controller or microprocessor in the disk drive, such as in controller electronics 114. The processor or controller may perform logical and arithmetic operations based on the program instructions stored in memory, and/or the functions described above may be performed by hardware.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) disk drive comprising:
    a rotatable disk having a magnetic recording layer, the recording layer having a plurality of data tracks, each data track having a plurality of data regions and nondata regions;
    a write head comprising an electrically conductive coil and a write pole, the coil being adapted to generate write pulses to thereby cause the write pole to write data regions as the disk rotates;
    a carrier for supporting the write head, the carrier having a disk-facing surface;
    a laser;
    a near-field transducer (NFT) on the carrier and coupled to the laser for heating the data regions to facilitate writing of the data regions by the write pole as the disk rotates;
    a controller coupled to the write head for initiating writing to the data regions and to the laser for setting laser power levels, the laser power settings determining the heat generated by the NFT to the data regions during writing;
    an electrically conductive sensor on the carrier, the sensor being adapted to exhibit a change in electrical resistance in response to a change in temperature;
    electrical circuitry coupled to the sensor and for providing an output signal representative of a change in electrical resistance of the sensor; and
    a processor coupled to the controller and the sensor circuitry for computing a prediction of the laser power to be applied during writing a selected data region from a history of prior laser power settings corresponding to writing prior data regions, for computing a difference between said sensor circuitry output signal and said predicted laser power, and for generating a signal to the controller to adjust the laser power setting and initiate re-writing of said selected data region if the absolute value of said computed difference is greater than a predetermined threshold.

2. The HAMR disk drive of claim 1 wherein the laser power setting for a selected data region k is x(k) and the computed predicted laser power is w(k), and further comprising memory coupled to the processor, the memory being adapted to contain a history of laser power settings including x(k−1) and x(k−2) and a set of coefficients including a(0), a(1) and a(2); and wherein computing said prediction comprises computing w(k) as the sum of a(0)*x(k), a(1)*x(k−1) and a(2)x*(k−2).

3. The HAMR disk drive of claim 2 wherein said sensor circuitry output signal is representative of a measured power value y(k) corresponding to x(k), and wherein computing said difference comprises computing y(k)−w(k).

4. The HAMR disk drive of claim 1 further comprising an analog-to-digital converter (ADC) coupled to the controller and connected between said electrical circuitry and the processor for sending digital measured power values to the processor, the ADC being adapted to be responsive to timing pulses from the controller.

5. The HAMR disk drive of claim 1 further comprising a waveguide coupling the laser to the NFT, and wherein the electrically conductive sensor is located adjacent the waveguide and recessed from the disk-facing surface of the carrier.

6. The HAMR disk drive of claim 1 wherein the thermal sensor is located at the disk-facing surface near the NFT.

7. The HAMR disk drive of claim 1 wherein the data regions are patterned into discrete spaced-apart data islands.

8. A heat-assisted magnetic recording (HAMR) disk drive comprising:
    a rotatable disk having a magnetic recording layer, the recording layer having a plurality of data tracks, each data track having a plurality of data regions and nondata regions;
    a write head comprising an electrically conductive coil and a write pole, the coil being adapted to generate write pulses to cause the write pole to thereby facilitate magnetization of the data regions as the disk rotates;
    a carrier for supporting the write head, the carrier having a disk-facing surface;
    a laser capable of multiple power settings;
    a near-field transducer (NFT) on the carrier and coupled to the laser for heating the data regions to facilitate magnetization of the data regions by the write pole as the disk rotates;
    a waveguide on the carrier and coupling the laser to the NFT;
    an electrically conductive sensor on the carrier near the waveguide and recessed from the disk-facing surface of the carrier, the sensor adapted to be responsive to heat from the waveguide and being adapted to exhibit a change in electrical resistance in response to a change in temperature;
    electrical circuitry coupled to the sensor and for providing an output signal representative of a change in electrical resistance of the sensor;
    an analog-to-digital converter (ADC) for converting the output signal from said electrical circuitry to digital measured power values; and machine-readable memory containing a program of instructions; and a controller for controlling the writing of data to a data region and for reading and executing the program of instructions, the controller being configured to execute the program instruction acts of:

setting the laser to a power setting $x(k)$;

timing the ADC to generate a digital measured power value $y(k)$ corresponding to the laser power setting $x(k)$, storing in memory a sequence of laser power settings including $x(k)$, $x(k-1)$ and $x(k-2)$ where $x(k-1)$ and $x(k-2)$ are prior laser power settings;

performing a calibration of the sensor to generate a sequence of coefficients $a(n)$ including $a(0)$, $a(1)$ and $a(2)$;

performing a convolution of said sequence of laser power settings with said sequence of coefficients to generate a predicted power value $w(k)$;

calculating $y(k)-w(k)$; and if the absolute value of $y(k)-w(k)$ is greater than a predetermined threshold, then adjusting the laser power setting and initiating a rewrite of data to the data region.

9. The HAMR disk drive according to claim 8 wherein the act executable by the controller of performing said calibration comprises, when the disk drive is not reading or writing data:

setting the laser power to a nominal setting for a predetermined time period;

receiving from the ADC a sequence of digital measured power values at periodic time intervals after said predetermined time period, said sequence corresponding to said sequence of coefficients; and storing in memory said sequence of coefficients.

10. The HAMR disk drive of claim 8 wherein the data regions are patterned into discrete spaced-apart data islands.

11. A heat-assisted magnetic recording (HAMR) disk drive comprising:

a rotatable disk having a magnetic recording layer, the recording layer having a plurality of data tracks, each data track having a plurality of data sectors and nondata regions;

a write head comprising an electrically conductive coil and a write pole, the coil being adapted to generate write pulses to thereby cause the write pole to facilitate magnetization of the data sectors as the disk rotates;

a carrier for supporting the write head, the carrier having a disk-facing surface;

a laser;

a near-field transducer (NFT) on the carrier and coupled to the laser for heating the data sectors to facilitate magnetization of the data sectors by the write pole as the disk rotates;

a controller coupled to the laser for setting laser power levels, the laser power settings determining the heat generated by the NFT to the data sectors;

an electrically conductive sensor on the carrier, the sensor being adapted to exhibit a change in electrical resistance in response to a change in temperature;

electrical circuitry coupled to the sensor and for providing an output signal representative of a change in electrical resistance of the sensor;

a processor coupled to the controller and the sensor circuitry for computing a prediction of the laser power from a history of laser power settings, for computing a difference between said sensor circuitry output signal and said predicted laser power, and for generating an error signal to the controller in response to said computed difference, wherein the laser power setting for a selected data sector k is $x(k)$ and the computed predicted laser power is $w(k)$; and memory coupled to the processor, the memory being adapted to contain a history of laser power settings including $x(k-1)$ and $x(k-2)$ and a set of coefficients including $a(0)$, $a(1)$ and $a(2)$; and wherein computing said prediction comprises computing $w(k)$ as the sum of $a(0)*x(k)$, $a(1)*x(k-1)$ and $a(2)x*(k-2)$.

12. The HAMR disk drive of claim 11 wherein said sensor circuitry output signal is representative of a measured power value $y(k)$ corresponding to $x(k)$, and wherein computing said difference comprises computing $y(k)-w(k)$.

13. The HAMR disk drive of claim 11 further comprising an analog-to-digital converter (ADC) coupled to the controller and connected between said electrical circuitry and the processor for sending digital measured power values to the processor, the ADC being adapted to be responsive to timing pulses from the controller.

14. The HAMR disk drive of claim 11 further comprising a waveguide coupling the laser to the NFT, and wherein the electrically conductive sensor is located adjacent the waveguide and recessed from the disk-facing surface of the carrier.

15. The HAMR disk drive of claim 11 wherein the thermal sensor is located at the disk-facing surface near the NFT.

16. The HAMR disk drive of claim 11 wherein the data sectors are patterned into discrete spaced-apart data islands.

* * * * *